US007287977B2

(12) United States Patent
Serniuck et al.

(10) Patent No.: US 7,287,977 B2
(45) Date of Patent: Oct. 30, 2007

(54) HOT RUNNER MANIFOLD SYSTEM

(75) Inventors: Nicholas Serniuck, Oakville (CA); John Knapp, Jeffersonville, VT (US); Abdeslam Bouti, Swanton, VT (US); Edward J. Jenko, Essex Junction, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 269 days.

(21) Appl. No.: 10/542,737

(22) PCT Filed: Feb. 4, 2003

(86) PCT No.: PCT/CA03/00143

§ 371 (c)(1),
(2), (4) Date: Oct. 3, 2005

(87) PCT Pub. No.: WO2004/069517

PCT Pub. Date: Aug. 19, 2004

(65) Prior Publication Data
US 2006/0204611 A1 Sep. 14, 2006

(51) Int. Cl.
*B29C 45/22* (2006.01)
(52) U.S. Cl. ................ 425/564; 425/566; 425/572
(58) Field of Classification Search ............. 425/564, 425/566, 572
See application file for complete search history.

(56) References Cited
U.S. PATENT DOCUMENTS

| | | | |
|---|---|---|---|
| 5,894,023 A | | 4/1999 | Blank |
| 6,196,826 B1 * | | 3/2001 | Gellert et al. ............. 425/566 |
| RE38,480 E * | | 3/2004 | Catoen et al. ............. 425/564 |
| 6,713,002 B2 * | | 3/2004 | Kazmer et al. ............. 425/564 |

FOREIGN PATENT DOCUMENTS

| | | | |
|---|---|---|---|
| EP | 0 468 485 A | | 1/1992 |
| EP | 480223 | * | 4/1992 |
| JP | 8 300418 A | | 11/1996 |

OTHER PUBLICATIONS

International Search Report for PCT/CA03/00143 (priority document in the instant case), Mailing date of Jun. 11, 2003.
International Preliminary Examination Report for PCT/CA03/00143 (priority document in the instance case), Mailing date of Mar. 12, 2004.

* cited by examiner

*Primary Examiner*—Tim Heitbrink

(57) ABSTRACT

A manifold system (50) comprising a main manifold (56) with a plurality of arms (64), a plurality of sub-manifolds (52) spaced from the main manifold (56) and communicating with the main manifold (56) through a plurality of melt transfer bushings (68) disposed between the main manifold (56) and the sub-manifolds (52). The melt transfer bushings (68) may include static mixers (140) to homogenize the melt. An air plate (70) is disposed between a backing plate (58) preferably housing the main manifold (56) and a manifold plate (54) preferably housing the sub-manifolds (52). The air plate (70) has a plurality of air channels (74) that communicate with valve gate nozzle actuators (90), which are received in actuator cavities (72) in the air plate (70). The air plate (70) is bolted to the manifold plate (54), and the backing plate (58) is bolted to the air plate (70) with bolting patterns not constrained by location of the main manifold (56) or sub-manifolds (52). The manifold system (50), as shown in FIG. 5, has better thermal and geometric balance, closer nozzle spacing, and better bolting for less plate bowing.

21 Claims, 8 Drawing Sheets

HOT RUNNER MANIFOLD SYSTEM

TECHNICAL FIELD

The present invention relates, generally, to injection molding equipment. More particularly, the invention relates to hot runner manifold systems used for injection molding. The invention has particular utility in large cavitation systems.

BACKGROUND OF THE INVENTION

The state of the art includes various arrangements for hot runner manifold systems to transfer molten material, typically plastic resin, from an injection molding machine to a mold. Hot runner manifold systems are well known and typically include a manifold plate, a manifold housed in the manifold plate, and a backing plate that supports the manifold and manifold plate. The manifold system routes molten material from a central sprue, which connects to an injection unit on an injection molding machine, to a plurality of nozzles which inject the molten material into cavities in the mold. The manifold system divides the flow of the molten material into several branches as it flows from the central sprue to the nozzles. It is desirable that flow of molten material through the manifold system be balanced so that material arriving at each nozzle has approximately the same temperature and pressure to produce uniform parts in each mold cavity. Toward that end, manifold systems are preferably designed so that each branch provides substantially the same size and length of flow path for the molten material. With uniform flow paths at each branch, temperature and pressure differences between branches should be minimized. However, for molds with a high number of cavities, such uniform flow paths are not always possible due to location limitations on the manifold.

Referring to FIGS. 1 and 2, a prior art manifold system using two plates is shown with portions of the plates and main manifold cut away to reveal internal detail. For injection molding systems with many cavities in the mold, a manifold assembly 10 has a plurality of sub-manifolds 12 arranged in manifold plate 14 and fed by a main manifold 16 mounted in backing plate 18. Sprue 20 connects to the main manifold 16 at a central location. Main manifold 16 has a melt channel 22 with branches to each arm 24 of main manifold 16 and connecting to an inlet of each sub-manifold 12. Each sub-manifold 12 has its own melt channel network that communicates the molten material from main manifold 16 to nozzles (not shown) connected to each sub-manifold 12. In the example illustrated, each sub-manifold 12 accommodates twenty-four nozzles. Typically, valve-gate type nozzles are used with such a system, and have pneumatic valve actuators at the upper end of the nozzle that actuate valve stems in the nozzle. The valve stems extend through apertures 26 in the sub-manifolds 12 and the actuators are housed in actuator cavities 28 formed in backing plate 18.

Such prior art manifold systems have significant limitations and shortcomings. Specifically, since the main manifold 16 and actuator cavities 28 are both in backing plate 18, and the main manifold 16 cannot pass through actuator cavities 28, the transverse spacing of actuator cavities 28, and hence the nozzles, can be greater than desired. That leads to the mold being larger than optimum, and flow length of the molten material being increased.

Air lines 30 are routed to each actuator through the backing plate 18. The location of the air lines is constrained by the location of the manifold 16. Also since the location of the arms 24 of main manifold 16 is constrained by the location of actuator cavities 28, flow of molten material to portions of sub-manifolds 12 is not optimum. In the example illustrated, arm 24a conducts molten material through melt channel 22 to branches 32a and 32b to two sub-manifolds 12a and 12b at portions 34a and 34b located at the periphery of sub-manifolds 12a and 12b. Material then flows to a central location in the sub-manifolds and subsequently through multiple channels to the nozzles. Such a flow path increases the likelihood of the molten material having less uniform temperature and pressure throughout the sub-manifolds 12, which can lead to unbalance in the system.

Physical coupling, typically through the use of bolts, between the backing plate 18 and the manifold plate 14 stabilizes the layered structure by restricting bowing during the injection cycle. Plate bowing arises as a consequence of the injection pressure and pressure from spring-loaded seals at interfaces between the sub-manifolds 12 and nozzles and also between the sub-manifolds 12 and the arms 24 of the main manifold 16. If the plates bow, leakage can occur at those interfaces. Pillars 36 are provided in manifold plate 14 where possible, and numerous bolt holes 38 are provided through backing plate 18 to facilitate such bolting. However, bolts cannot be put through the melt channel 22 of manifold 16, so to make the bolt spacing adjacent the manifold 16 as tight as possible, the arms 24 of manifold 16 are made as narrow as possible. To maintain structural integrity of such narrow portions, the manifold 16 may have to be hardened or be made from a stronger material than is desirable.

SUMMARY OF THE INVENTION

The present invention provides an manifold system for an injection molding system comprising a main manifold with at least one arm, at least one sub-manifold spaced from the main manifold, and a plurality of melt transfer bushings between the main manifold and each sub-manifold. The main manifold has a main melt channel branching to each arm with an outlet at each branch. Each sub-manifold has an inlet and a plurality of secondary melt channels in communication with the inlet. Each melt transfer bushing is disposed between one of the sub-manifolds and one of the arms of the main manifold, and provides communication between the outlet of one of the arms of the main manifold and the inlet of one of the sub-manifolds. An air plate is disposed between the main manifold and the at least one sub-manifold, and between a backing plate, that preferably houses the main manifold, and a manifold plate, that preferably houses the at least one sub-manifold. The air plate has a plurality of actuator cavities for receiving actuators for nozzles. The air plate also has a plurality of air channels therein which communicate with the actuator cavities for conducting fluid, in use, to the actuators. The air plate also preferably has a plurality of cooling channels for conducting cooling fluid, in use, to cool the air plate.

The air plate preferably has a plurality of air plate bolt holes, which receive bolts to secure the air plate to the manifold plate. A plurality of the air plate bolt holes may be disposed directly beneath the main manifold. The backing plate has a plurality of backing plate bolt holes which receive bolts to secure the backing plate to air plate. A plurality of the backing plate bolt holes are disposed directly above sub-manifolds.

Each melt transfer bushing has a melt channel therein and preferably a static mixer is disposed in the melt channel to homogenize the molten material at the entrance to each sub-manifold. Preferably each melt transfer bushing has a heating device, such as an electric heater or at least one heat pipe which transfers heat from the main manifold and a sub-manifold to the melt transfer bushing.

Preferably, a plurality of valve gate nozzles are connected to each sub-manifold, each nozzle has a melt channel in communication with a secondary melt channel in a sub-manifold, and each nozzle has a valve gate actuator disposed in one of the actuator cavities in the air plate. Each sub-manifold has a plurality of manifold bushings aligning with the nozzles and providing the communication between the melt channel in the nozzles and the secondary melt channels in the sub-manifold. Each manifold bushing has a flat sealing surface, and each nozzle preferably has a non-flat sealing surface adjacent the flat sealing surface of the manifold bushing, which reduces the force required to adequately seal the sealing surfaces. Preferably the non-flat sealing surface is a raised conical surface around a melt channel of the nozzle angled less than one degree from planar.

Similarly, the main manifold preferably has a flat sealing surface, and the melt transfer bushing preferably has a non flat sealing surface adjacent the flat sealing surface.

The invention provides the opportunity for flow paths in such manifolds to be routed where needed without regard to nozzle location. The invention also provides the opportunity for a mixer to be inserted at each melt transfer bushing between manifolds to thereby enhance mixing of resin being conducted therethrough and balancing of the system.

Thus, the present invention provides an improved manifold and plate assembly, which overcomes the limitations and shortcomings of the prior art.

BRIEF DESCRIPTION OF THE DRAWINGS

Exemplary embodiments of the present invention will not be described with reference to the accompanying drawings, in which.

DETAILED DESCRIPTION OF THE PREFERRED EMBODIMENT(S)

Figure 1:
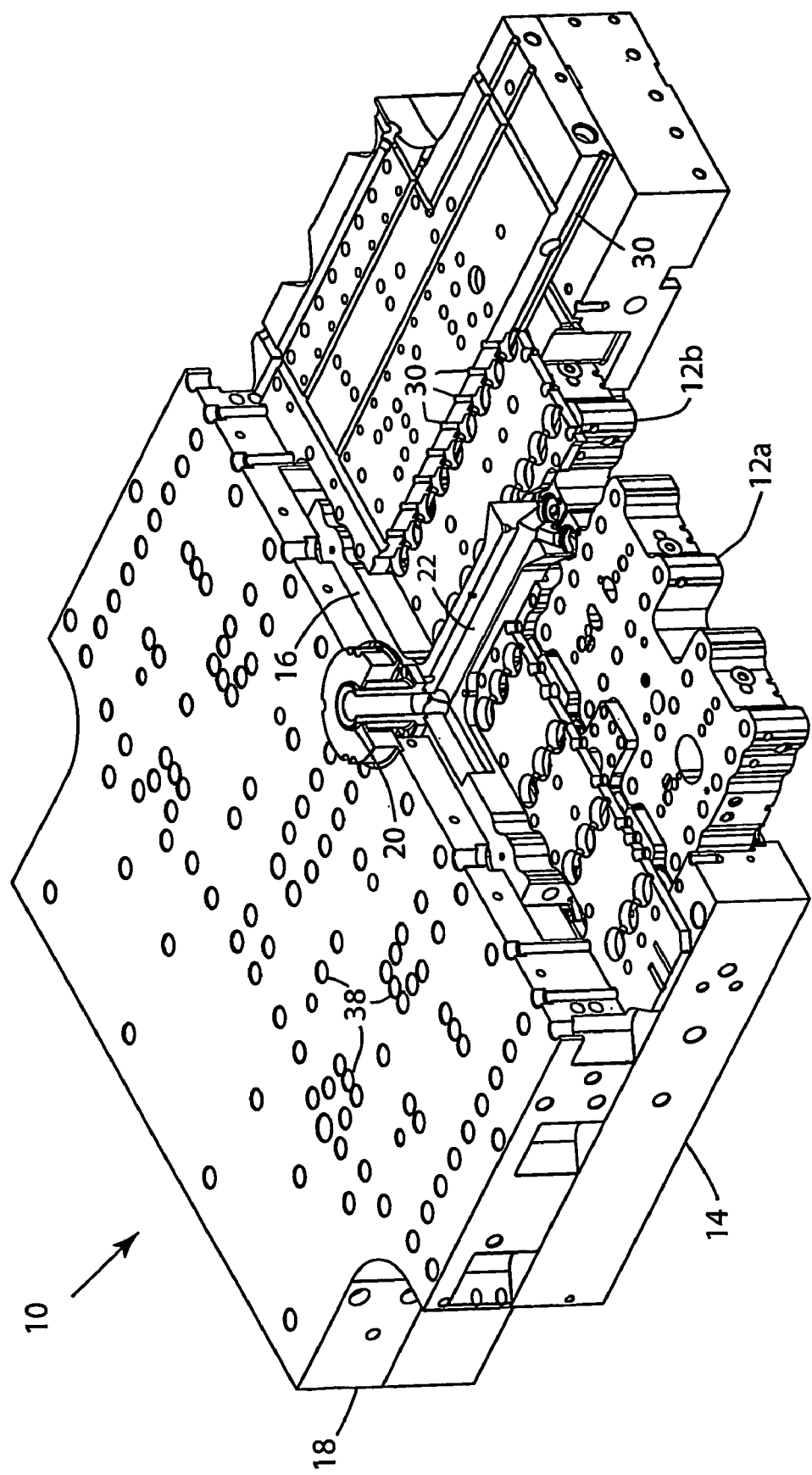
FIG. 1 is an isometric view of a prior art manifold assembly with portions of plates and the manifold shown cut away.
Figure 2:
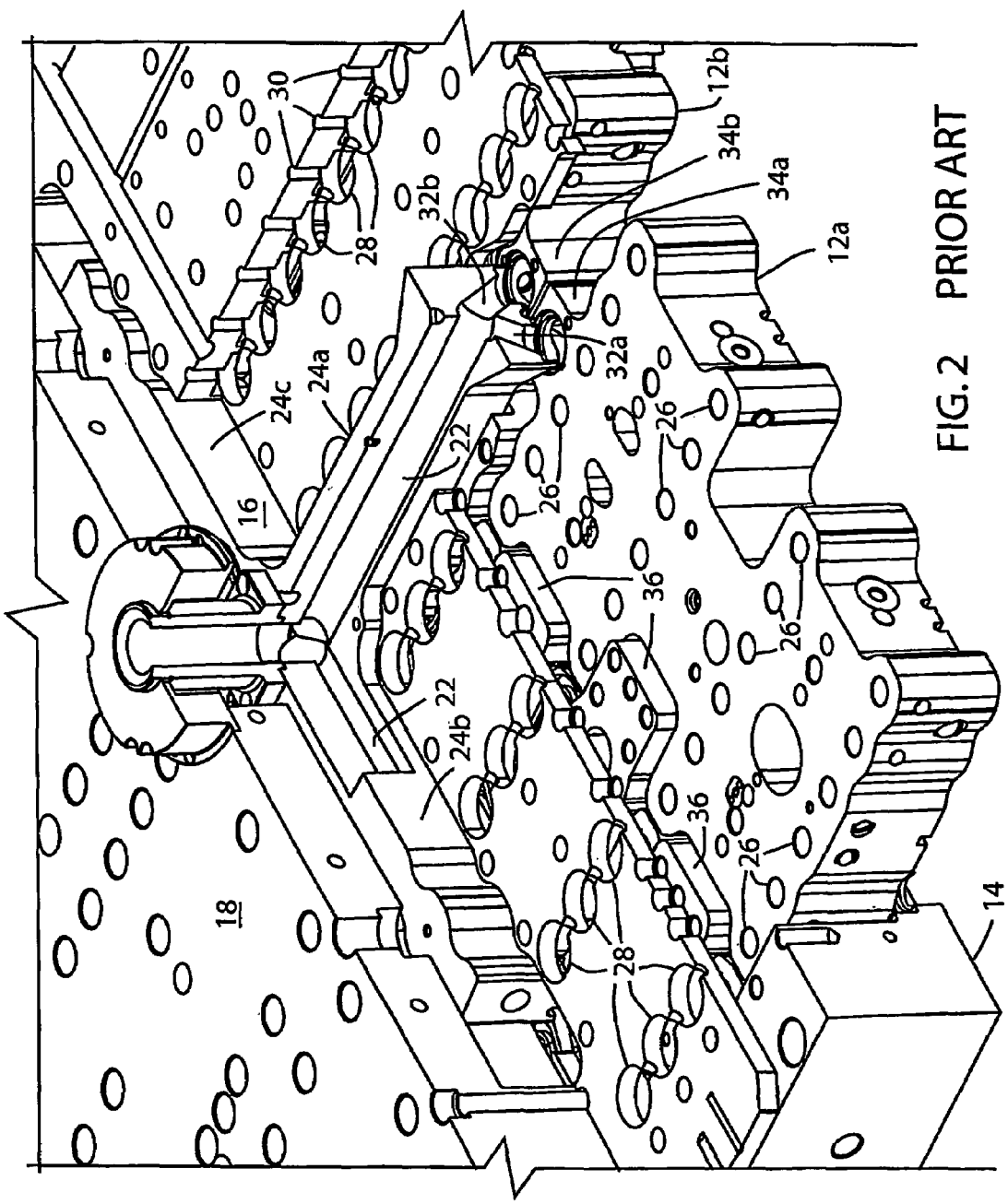
FIG. 2 is a detail view of a portion of FIG. 1.
Figure 3:
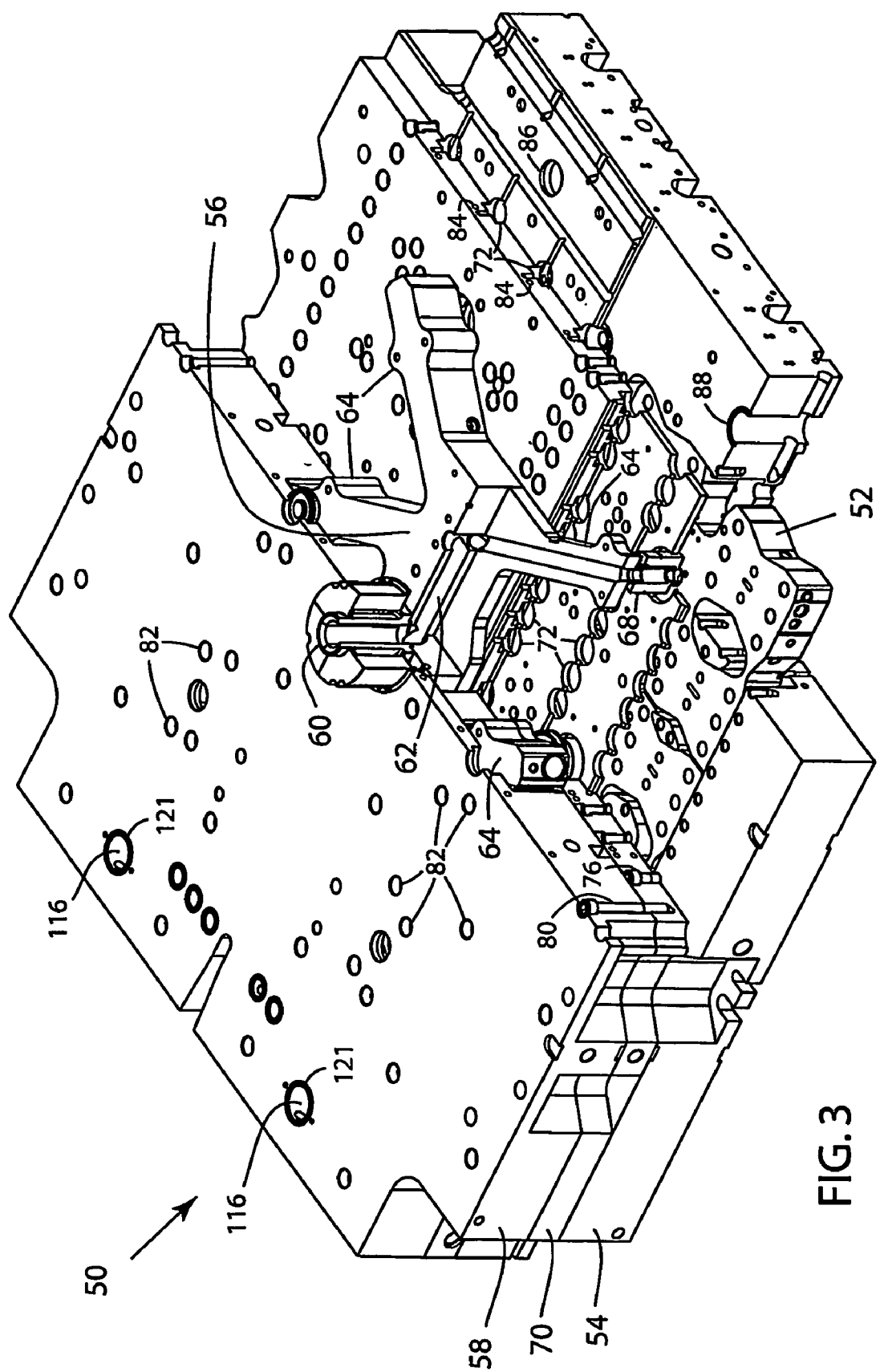
FIG. 3 is an is isometric view of a preferred embodiment of the present invention with portions of plates and the manifold shown cut away.
Figure 4:
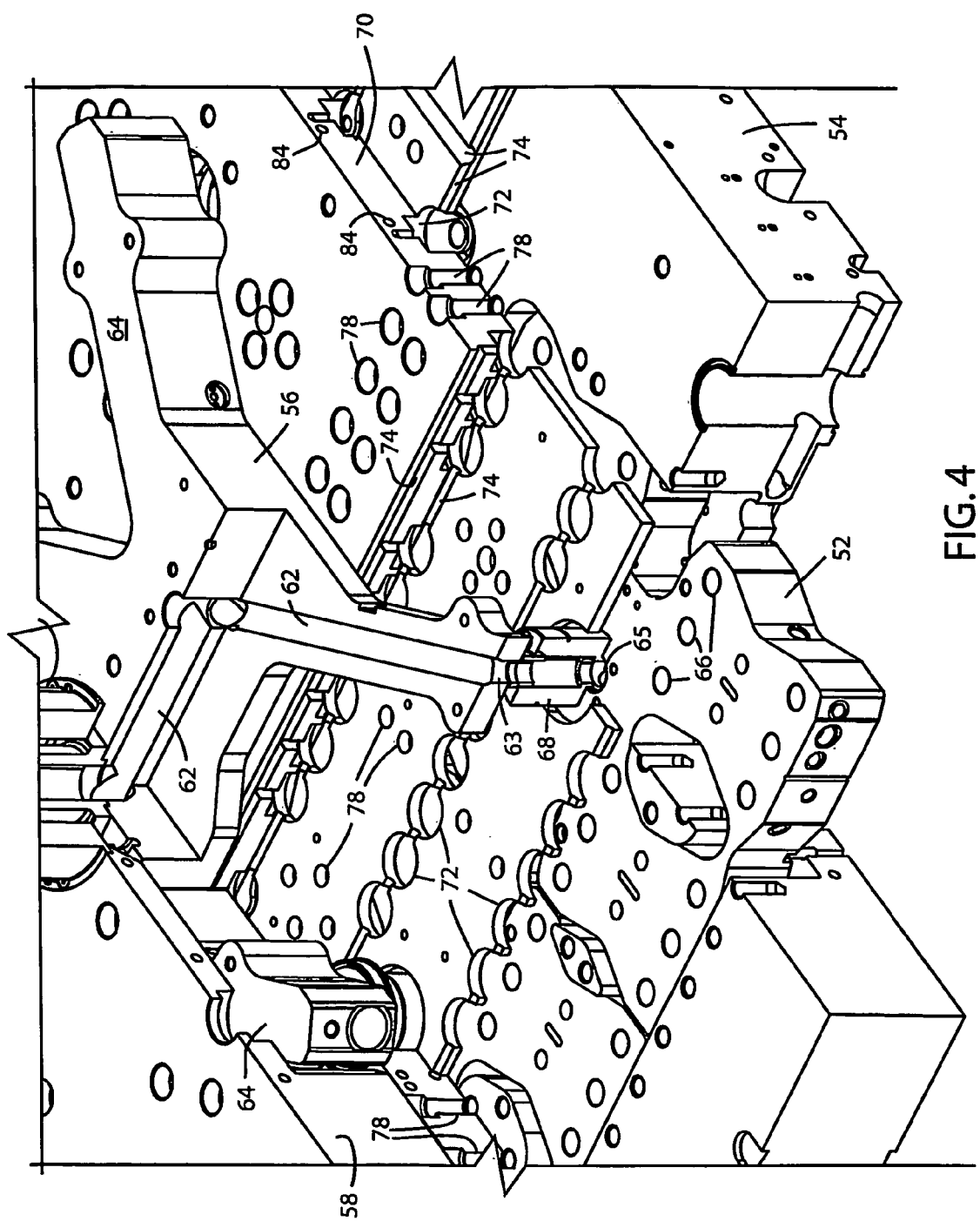
FIG. 4 is a detail view of a portion of FIG. 3.
Figure 5:
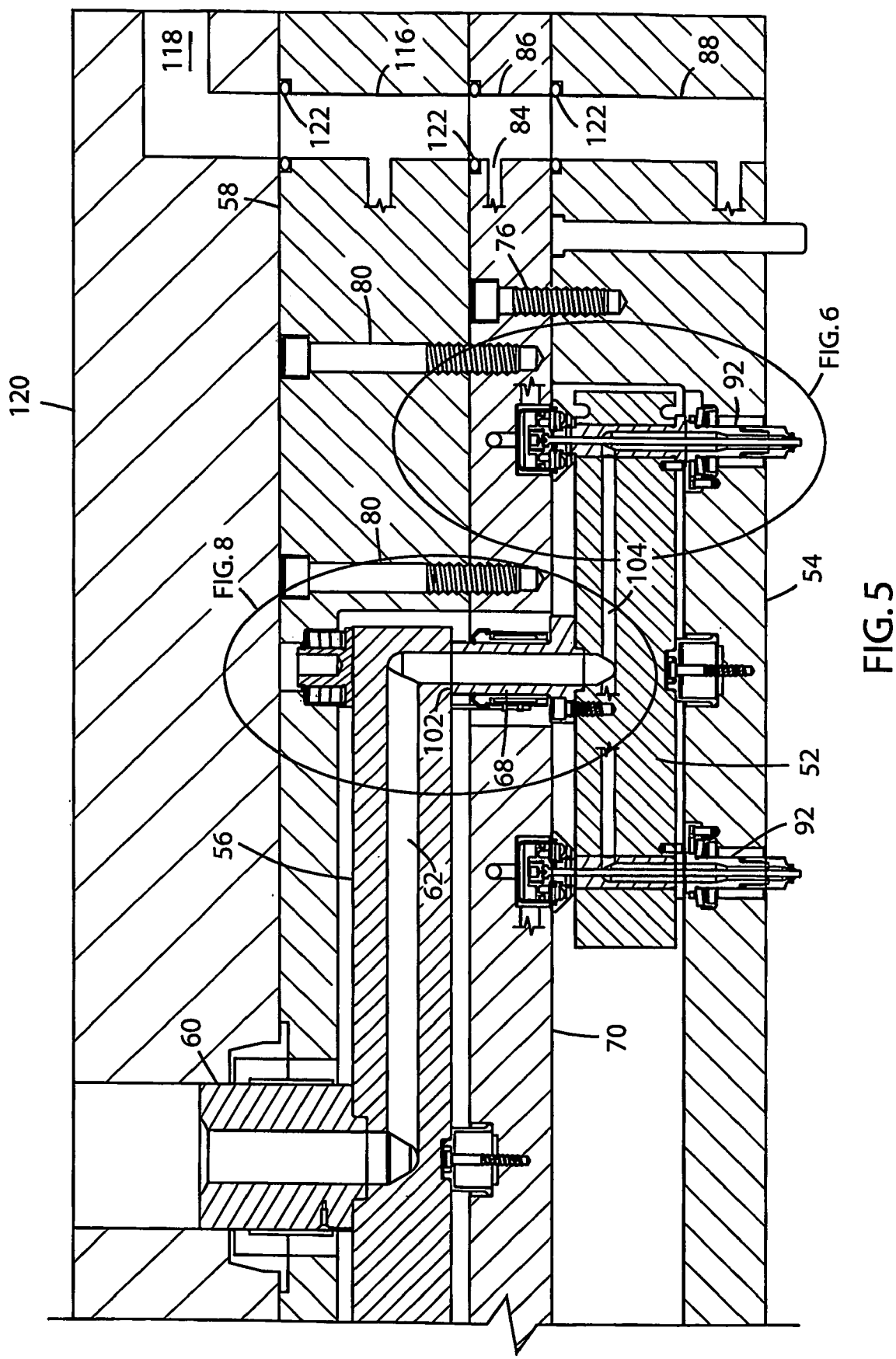
FIG. 5 is a section view of a preferred embodiment of the invention illustrating positional relationships among components.

Referring to FIGS. 3-5, an example of the preferred embodiment of a manifold assembly of the present invention is illustrated and generally indicated by the reference numeral 50. The hot runner manifold system 50 has a plurality of sub-manifolds 52 that are preferably arranged and housed in manifold plate 54 and are fed by a main manifold 56 preferably housed in backing plate 58. As with the prior art manifolds, a sprue 60 connects to the main manifold 56 at a central location, and main manifold 56 has a main melt channel 62 that branches into arms 64 of main manifold 56. Arms 64 may branch in several different directions, such as is illustrated, or a manifold may have only two arms aligned and extending opposite from each other and from sprue 60 to make a linear manifold. The manifold may also have only one arm, which in that case, functions to offset the flow in one direction only. Each arm has an outlet 63 of a branch of the main melt channel 62 that is in communication with the inlet 65 of one of the sub-manifolds 52. The backing plate 58 is spaced from the manifold plate 54, so that main manifold 56 is spaced from the sub-manifolds 52, and at each arm 64 of main manifold 56 a melt transfer bushing 68 connects the outlet 63 of the main melt channel 62 to the inlet 65 of a sub-manifold 52. Each sub-manifold 52 has a plurality of secondary melt channels 104 in communication with inlet 65 and nozzles 92 connected to sub-manifold 52. Each sub-manifold 52 has apertures 66 through which valve stems for valve-gated nozzles pass.

Between the manifold plate 54 and the backing plate 58 is an air plate 70 that has a plurality of actuator cavities 72 for nozzle actuators 90 as well as a plurality of air channels 74 that conduct actuating fluid, such as air, to the actuators 90. The terms air plate and air channel are used only as labels and are not intended to limit the invention to the use of air. Other gaseous or liquid fluids can be used with the air plate to actuator the actuators 90. The actuator cavities 72 align with the apertures 66 in sub-manifolds. 52. Because the actuator cavities 72 for the actuators 90 and air channels 74 are not in the same plane as the main manifold 56, the main manifold 56 can take an optimum path to the sub-manifolds 52. Flow through the sub-manifolds 52 can be better balanced by introducing the molten material centrally rather than at one end of the sub-manifold 52, and the overall spacing of the actuator cavities 72, and hence the nozzles, can be closer, thereby reducing the overall size of the manifold and mold compared to the prior art.

Air plate 70 preferably has cooling channels 84 that, in use, conduct cooling fluid, such as water, through air plate 70, preferably proximate to actuator cavities 72 so that air plate 70 is sufficiently cool to prevent seal degradation for actuators 90 in actuator cavities 72. Cooling of air plate 70 also enhances thermal isolation between main manifold 56 and sub-manifolds 52, which minimizes thermal variation in sub-manifold 52 and improves the material flow balance in the system. Cooling channels 84 are aligned with and communicate with cooling ports 86 in air plate 70, which are aligned with and communicate with cooling ports 88 in manifold plate 54 and cooling ports 116 in backing plate 58.

Cooling ports 116 may be arranged to align with and communicate with cooling ports 118 in a platen 119 of an injection molding machine in which manifold system 50 can be installed. Preferably o-rings 121, or similar types of seals, are used to provide sealing between adjacent plate faces at interfaces of cooling ports 86, 88 and 116. Such arrangement of cooling lines and ports in the plates 54, 58, and 70 eliminate the need for any cooling fluid hoses to be attached directly to the manifold system 50. Cooling fluid is received directly from the platen, to which cooling fluid hoses are attached. This reduces the time necessary to remove manifold system 50 from the injection molding machine since there are no hoses or hose fittings to disconnect from the manifold system 50.

Bolting together of the plates 54, 58 and 70 is also improved with the present invention. Air plate 70 can be bolted to manifold plate 54 as desired with little concern for location of main manifold 56 since bolts 76 extend only between the air plate 70 and manifold plate 54. A plurality of air plate bolt holes 78 in air plate 70 provide for such bolting, with air plate bolt holes 78 running under main manifold 56 as needed to best counteract forces tending to separate the plates. The backing plate 58 can then be bolted to air plate 70 with little concern for the position of sub-manifolds 52, since bolts 80 extend only between backing plate 58 and air plate 70. Backing plate bolt holes 82 can be located very close to where separation forces occur near ends of manifold arms 64, and directly over a sub-manifold 52. The better plate bolting of the present invention provides less likelihood of plate bowing, and thereby less likelihood of resin linkage at interfaces between components.

In the embodiment illustrated in FIG. 5, air plate 70 is shown as a relatively thin plate while manifold plate 54 and backing plate 58 both are thicker with pockets that house the sub-manifolds 52 and main manifold 56 respectively. Alternatively, the air plate 70 could be thicker and incorporate the pockets to house the main manifold 56 and/or the sub-manifolds. Such an arrangement allows manifold plate 54 and/or backing plate 58 to be substantially thinner plates, either bolting to air plate 70.

Figure 6:
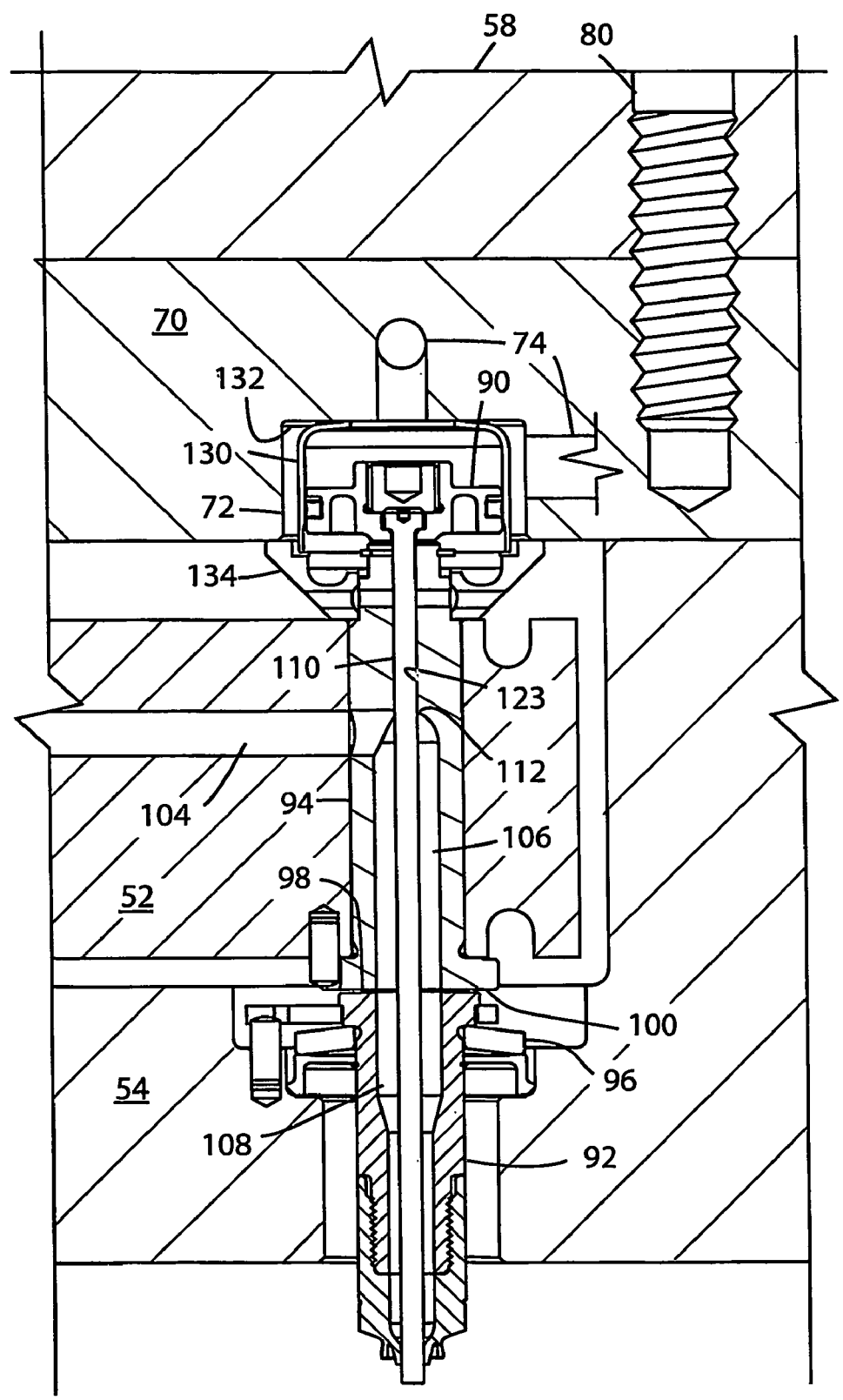
FIG. 6 is a detail view of a portion of FIG. 5.

Referring to FIGS. 5 and 6, sub-manifolds 52 are constructed and arranged such that a plurality of nozzles 92 connect to them in a manner well-known in the art. Any nozzle configuration and any nozzle attachment method known in the art can be used with sub-manifold 52. For example, in the embodiment illustrated, nozzle 92 is spring-loaded against a manifold bushing 94 by spring 96. Nozzle 92 preferably has a non-flat sealing surface 98 adjacent the flat sealing surface 100 of manifold bushing 94, which reduces the force required to adequately seal the sealing surfaces because of reduced contact area. Preferably the non-flat sealing surface 98 is a raised conical surface around melt channel 108 in nozzle 92 that is angled less than one degree from planar as described in U.S. patent application Ser. No. 09/575,353, hereby incorporated herein by reference. A similar sealing interface is preferably provided between end 102 of melt transfer bushing 68 and main manifold 56.

In the embodiment illustrated, manifold bushing 94 communicates with a melt channel 104 in sub-manifold 52 and directs molten material to nozzle 92 through a manifold bushing melt-channel 106 that is aligned with the axial melt channel 108 in nozzle 92. A sealing interface 112 occurs between valve stem 110 and manifold bushing valve stem guide channel 123 to prevent resin linkage along valve stem 110 to actuator 90.

Figure 7:
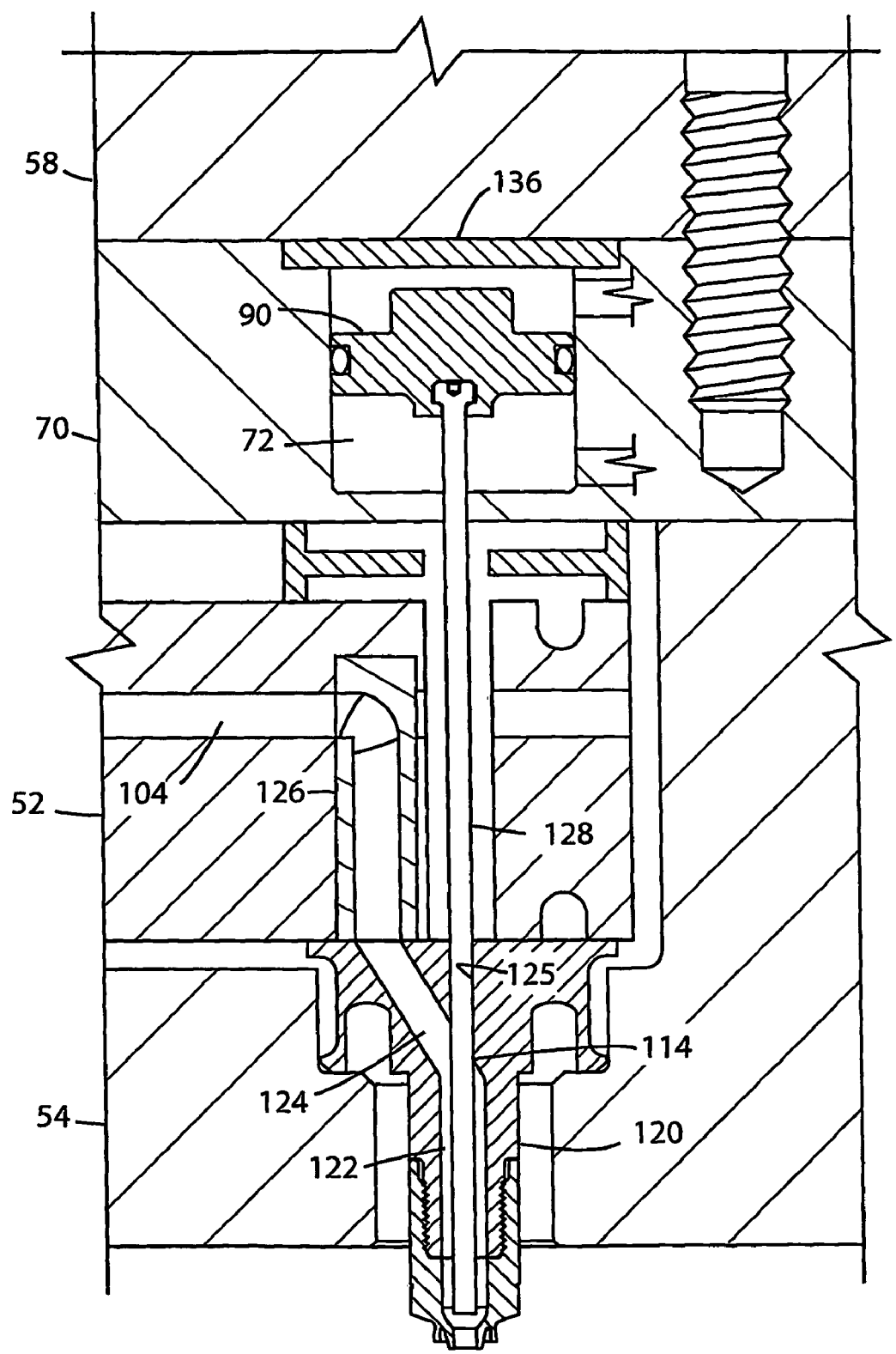
FIG. 7 is the view of FIG. 6 illustrating an alternate embodiment for a nozzle configuration.

Another example of a nozzle/manifold assembly is illustrated in FIG. 7, where nozzle 120 has a melt channel 122 with a non-axial portion 124 that engages a manifold bushing 126 which communicates with melt channel 104. A sealing interface 114 occurs between valve stem 128 and a valve stem guide channel 125 in nozzle 120 to prevent resin linkage along valve stem 128 to actuator 90.

FIGS. 6 and 7 also illustrate different embodiments for actuator 90. In the embodiment illustrated in FIG. 6, actuator 90 is housed in a separate cylinder 130, which is installed in actuator cavity 72 formed in the bottom of air plate 70. Cylinder 130 seals between the base 132 of actuator cavity 72 and a backup pad 134 disposed between sub-manifold 52 and air plate 70. Such sealing of a cylinder in an actuator cavity with a backup pad is described in U.S. Pat. No. 6,343,925 assigned to the same assignee as the present invention and hereby incorporated by reference. In the embodiment illustrated in FIG. 7, actuator cavity 72 is formed in the top of air plate 70 and is itself the cylinder for actuator 90. A separate seal plate 136 is optionally provided to seal actuator cavity 72, or backing plate 58 itself could seal actuator cavity 72. This requires each actuator cavity to be a cylinder of sufficient quality to allow proper operation of actuator 90, but it does not require any seal that is dependent on the loads generated by installation of components below the air plate 70.

Figure 8:
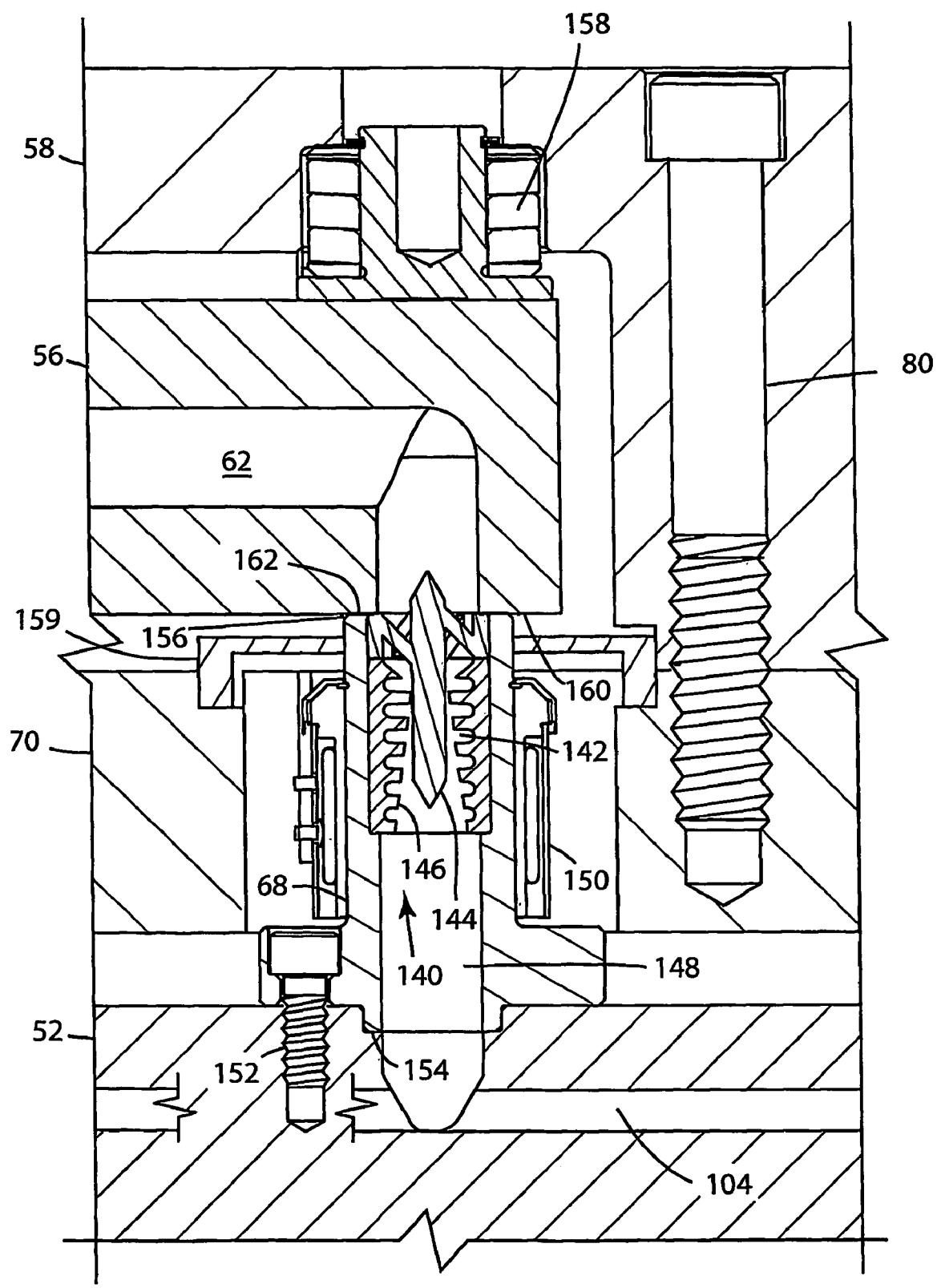
FIG. 8 is a further detailed view of a portion of FIG. 5.

Referring to FIG. 8, another advantage of the hot runner manifold system 50 of the present invention is that since the main manifold 56 is spaced from the sub-manifolds 52, the melt transfer bushings 68 are sufficiently long to allow installation of a static mixer 140 in the flow channel 148 of each melt transfer bushing. The static mixer 140 homogenizes the molten material at the entrance to each sub-manifold 52, thereby providing a more balanced flow of the molten material. Static mixers suitable for such application are well known. The invention is not limited to the use of any particular static mixer. An example of one suitable mixer, as illustrated, is described in U.S. Pat. No. 6,382,528 assigned to the same assignee as the present invention and hereby incorporated herein by reference. Mixer 140 has a spiral groove 142 around a central shaft 144 with an increasing space between the shaft 144 and the lands 146 adjacent the groove 142. Flow of the molten material through the mixer 140 is transitioned from spiral flow to axial flow and homogenized in the process. Another example of a static mixer suitable for use in melt transfer bushing 68 is a stack of static mixing elements as described in U.S. Pat. No. 6,394,644, herein incorporated by reference.

Melt transfer bushing 68 preferably has a heating device 150 so that there is little temperature loss in the molten material as it flows through melt transfer bushing 68. The heating device 150 preferably is an electric heater, but heating device 150 may be at least one heat pipe that draws heat from main manifold 56 and sub-manifold 52 to sufficiently heat melt transfer bushing 68. Alternatively, melt transfer bushing 68 could be constructed of a material sufficiently thermally conductive to not require any heating device 150. Melt transfer bushing 68 may itself function as a heat pipe drawing sufficient heat from main manifold 56 and sub-manifold 52.

Melt transfer bushing 68 is preferably fastened to sub-manifold 52, such as by bolts 152 (only one of which is shown for clarity) which provide sufficient compressive force between the melt transfer bushing 68 and sub-manifold 52 to seal the interface 154 between melt channel 148 in melt transfer bushing 68 and melt channel 104 in sub-manifold 52. To seal the interface 156 between melt channel 148 in melt transfer bushing 68 and melt channel 62 in main manifold 56, force is exerted by a spring device 158 acting between main manifold 56 and backing plate 58 and preferably aligned with melt channel 148. The main manifold 56 preferably has a flat sealing surface 160, and the melt transfer bushing 68 preferably has a non-flat sealing surface 162 adjacent the flat sealing surface 160. Preferably the non-flat sealing surface 162 is a raised conical surface around the melt channel 148 of the melt transfer bushing 68, and is angled less than one degree from planar, as previously described. Of course, sealing between the melt transfer bushing 68 and main manifold 56 could be achieved using alternative techniques readily appreciated by one skilled in the art.

With melt transfer bushing 68 fixed to sub-manifold 52 by bolts 152, relative lateral motion between sub-manifold 52 and main manifold 56 due to thermal expansion differences occurs at interface 156. Because of the high frictional load at interface 156 from spring device 158, rather than melt transfer bushing 68 sliding relative to main manifold 56 at interface 156, melt transfer bushing 68 may bend during such movement allowing interface 156 to leak. A centering feature 159, such as a ring, acts between melt transfer bushing 68 and air plate 70 to facilitate sliding of melt transfer bushing 68 relative to main manifold 56 at interface 156 when there is relative lateral motion between sub-manifold 52 and main manifold 56. Centering feature 159 keeps melt transfer bushing properly located in air plate 70 and minimizes risk of leaking at interface 156 by minimizing likelihood of melt transfer bushing bending. Alternatively, melt transfer bushing could be made substantially stiff to sufficiently resist bending on its own, but such a design would be more massive, requiring more heat.

The present invention advantageously provides an improved hot runner manifold system with less likelihood of plate bowing and its associated leakage, better thermal and geometric balance, and closer nozzle spacing all due primarily to the main manifold being spaced from the sub-manifolds. The additional space also allows for insertion of an air plate that provides all the air for valve gate actuators as well as cooling fluid to better thermally isolate the main manifold from the sub-manifolds and to simplify installation and removal of the manifold system from an injection molding machine. There is also room for static mixers in melt transfer bushings between the main manifold and sub-manifolds to improve melt homogeneity. The invention provides the opportunity for flow paths in such manifolds to be routed where needed without regard to nozzle location. The invention also provides the opportunity for a mixer to be inserted at each melt transfer bushing between manifolds to thereby enhance mixing of resin being conducted therethrough and balancing of the system.

It will, of course, be understood that the above description has been given by way of example only and that modifications in detail may be made within the scope of the present invention. For example, it will be appreciated by one skilled in the art that more than two levels of manifolds may be supported by the invention. Sub-manifolds 52 may be grouped, for example, in groups of four, with each group fed by an "X" shaped manifold. Two, four, or more of those X-shaped manifolds with their sub-manifolds may be grouped and fed by another manifold. Such layering of manifolds can continue for as much space as the platen spacing of the molding machine allows.

It will also be appreciated by one skilled in the art that a manifold system of the present invention can be used with hot-tip type nozzles instead of valve gate type nozzles. With no valve gate to actuate, the air plate has no actuator cavities and no air channels, but can have cooling channels. The benefits of separating the main manifold from the sub-manifolds when used with hot-tip type nozzles are improved thermal isolation between the main manifold and sub-manifolds, which can be enhanced by cooling the air plate, and the ability to install static mixers in the melt transfer bushings to homogenize the melt and better balance the system.

What is claimed is:

1. A manifold system for an injection molding system, the manifold system comprising:
   a main manifold (56) having a plurality of arms (64) and a main melt channel (62) therein branching to each arm (64), with an outlet (63) at each arm (64);
   at least one sub-manifold (52) spaced from the main manifold (56), each sub-manifold (52) having an inlet (65) and a plurality of secondary melt channels (104) in communication with the inlet (65);
   a plurality of melt transfer bushings (68), each melt transfer bushing (68) disposed between one sub-manifold (52) and one arm (64) of the main manifold (56), each melt transfer bushing (68) providing communication between the inlet (65) of said one sub-manifold (52) and the outlet (63) of said one arm (64);
   a backing plate (58);
   a manifold plate (54) spaced form the backing plate (58);
   an air plate (70) disposed between the backing plate (58) and the manifold plate (54) and disposed between the main manifold (56) and the at least one sub-manifold, the air plate (70) having a plurality of actuator cavities (72) for receiving actuators (90), the air plate (70) having s a plurality of air channels (74) communicating with the actuator cavities (72) for conducting fluid, in use, to actuators (90).

2. The manifold system of claim 1, wherein the main manifold (56) is housed in the backing plate (58).

3. The manifold system of claims 1 or 2, wherein the at least one sub-manifold (52) is housed in the manifold plate (54).

4. The manifold system of claims 1 or 2, wherein the air plate (70) has a plurality of cooling channels (84) for conducting fluid, in use, to cool the air plate (70).

5. The manifold system of claim 4, wherein the cooling channels (84) are proximate the actuator cavities (72).

6. The manifold system of claims 1 or 2, wherein the air plate (70) has a plurality of air plate bolt holes (78) which receive bolts (76) to secure the air plate (70) to the manifold plate (54).

7. The manifold system of claim 6, wherein some of the air plate bolt holes (78) are disposed directly beneath the main manifold (56).

8. The manifold system of claims 1 or 2, wherein the backing plate (58) has a plurality of backing plate bolt holes (82) which receive bolts (80) to secure the backing plate (58) to the air plate (70).

9. The manifold system of claim 8, wherein some of the backing plate bolt boles (82) are disposed directly above a sub-manifold (52).

10. The manifold system of claims 1 or 2, further comprising a plurality of valve gate nozzles (92, 120) connected to each sub-manifold (52), each nozzle (92, 120) having a melt channel (108, 122, 124) in communication with a secondary melt channel (104) in a sub-manifold (52), each nozzle (92,120) having an actuator (90) disposed in one of the actuator cavities (72).

11. The manifold system of claim 10, wherein each sub-manifold has a plurality of manifold bushings (94, 126), each manifold bushing (94, 126) being aligned with one of the nozzles (92, 120) and providing the communication between the melt channel (108, 122, 124) in the nozzle (92, 120) and the secondary melt channel (104) in the sub-manifold (52).

12. The manifold system of claim 11, wherein each manifold bushing (94) receives a valve stem (110) extending from one of the actuators (90), through the manifold bushing (94), and through the nozzle (92), the valve stem (110), in use, being moved by the actuator (90) to start and stop the flow of molten material through the nozzle (92).

13. The manifold system of claim 12, wherein each manifold bushing (94) has a flat sealing surface (100), and wherein each nozzle (92) has a non-flat sealing surface (98) adjacent the flat sealing surface (100) of the manifold bushing (94).

14. The manifold system of claim 13, wherein the non-flat sealing surface (98) is a raised conical surface around a melt channel (108) of the nozzle (92) angled less than one degree from planar.

15. The manifold system of claims 1 or 2, wherein the main manifold (56) has a flat sealing surface (160), and wherein the melt transfer bushing (68) has a non-flat sealing surface (162) adjacent the flat sealing surface.

16. The manifold system of claim 15, wherein the non-flat sealing surface (162) is a raised conical surface around the melt channel (148) of the melt transfer bushing (68) angled less than one degree from planar.

17. The manifold system of claims 1 or 2, wherein each melt transfer bushing (68) has a melt channel (148) therein and further comprising a static mixer (140) disposed in the melt channel (148).

18. The manifold system of claims 1 or 2, wherein each melt transfer bushing (68) has a heating device (150).

19. The manifold system of claim 18, wherein the heating device (150) is one of:
   an electric heater; and
   at least one heat pipe arranged to transfer heat from the main manifold (56) and a sub-manifold (52) to the melt transfer bushing (68).

20. The manifold system of claims 1 or 2, further comprising:
   at least one centering feature (159), each centering feature (159) being associated with a melt transfer bushing (68) and acting between the air plate (70) and the melt transfer bushing (70) to facilitate sliding of melt transfer bushing (68) relative to main manifold (56) at their interface (156) when there is relative lateral motion between sub-manifold (52) and main manifold (56).

21. A manifold system for an injection molding system, the manifold system comprising:
   a main manifold (56) having a main melt channel (62) therein with an outlet (63);
   a sub-manifold (52) spaced from the main manifold (56), the sub-manifold (52) having an inlet (65) and a plurality of secondary melt channels (104) in communication with the inlet (65);
   a melt transfer bushing (68), disposed between the sub-manifold (52) and the main manifold (56), the melt transfer bushing (68) providing communication between the inlet (65) of the sub-manifold (52) and the outlet (63) of the main manifold (56);
   a backing plate (58);
   a manifold plate (54) spaced form the backing plate (58); an air plate (70) disposed between the backing plate (58) and the manifold plate (54) and disposed between the main manifold (56) and the sub-manifold, the air plate (70) having a plurality of actuator cavities (72) for receiving actuators (90), the air plate (70) having s a plurality of air channels (74) communicating with the actuator cavities (72) for conducting fluid, in use, to actuators (90).

* * * * *